(12) United States Patent
Leidy et al.

(10) Patent No.: US 8,910,497 B2
(45) Date of Patent: Dec. 16, 2014

(54) PROCESS FOR MELTING AND REFINING SILICA-BASED GLASS

(75) Inventors: D. Wayne Leidy, Perrysburg, OH (US); Dawid Dewet-Smith, Perrysburg, OH (US); Carl L. Fayerweather, Maumee, OH (US); Brett E. Hixson, Adrian, MI (US)

(73) Assignee: Owens Brocking Glass Container Inc., Perrysburg, OH (US)

( * ) Notice: Subject to any disclaimer, the term of this patent is extended or adjusted under 35 U.S.C. 154(b) by 56 days.

(21) Appl. No.: 13/288,681

(22) Filed: Nov. 3, 2011

(65) Prior Publication Data

US 2013/0111955 A1 May 9, 2013

(51) Int. Cl.
   C03B 5/173 (2006.01)
   C03B 5/225 (2006.01)

(52) U.S. Cl.
   CPC .............. *C03B 5/173* (2013.01); *C03B 5/2252* (2013.01)
   USPC ........................................ 65/134.9; 65/134.2

(58) Field of Classification Search
   CPC ............ C03B 1/00; C03B 3/02; C03B 5/173; C03B 5/2252; C03B 5/225
   USPC ................... 65/134.1, 134.2, 134.9
   See application file for complete search history.

(56) References Cited

U.S. PATENT DOCUMENTS

| | | | |
|---|---|---|---|
| 3,330,638 A * | 7/1967 | Brown | 65/134.3 |
| 3,445,255 A | 5/1969 | Monks, Jr. | |
| 3,532,483 A | 10/1970 | Cardot | |
| 3,573,887 A | 4/1971 | Mod et al. | |
| 3,753,743 A | 8/1973 | Kakuda et al. | |
| 3,785,834 A * | 1/1974 | Rapp | 501/2 |
| 3,915,684 A * | 10/1975 | Schornhorst | 65/135.9 |
| 3,967,943 A | 7/1976 | Seeley | |
| 4,133,666 A * | 1/1979 | Rhodes et al. | 65/101 |
| 4,325,724 A | 4/1982 | Froberg | |
| 4,539,030 A | 9/1985 | Demarest, Jr. et al. | |

(Continued)

FOREIGN PATENT DOCUMENTS

| | | |
|---|---|---|
| JP | 9 52729 A | 2/1997 |
| WO | WO 2011058323 A2 * | 5/2011 |

OTHER PUBLICATIONS

Takeshita, S. et al., Refining of Glasses Under Subatmospheric Pressures, Boletin de la Sociedad Espanola de Ceramica Y Vidrio, Madrid, vol. 31C, No. 6, Jan. 1, 1992, 6 pages.

(Continued)

*Primary Examiner* — Matthew Daniels
*Assistant Examiner* — Cynthia Szewczyk

(57) ABSTRACT

A process for making silica-based glass includes: (a) forming a glass precursor melt that includes glass network formers and glass network modifiers, the glass precursor melt being at a temperature in the range of 900 C to 1700 C and having a viscosity of not more than 3 Pa·s, and (b) refining the glass precursor melt. Either or both steps (a) and (b) can include stirring and/or be carried out under reduced pressure to enhance refining. The refined glass precursor melt preferably is mixed with additional materials including silica ($SiO_2$) to form a silica-based glass melt.

34 Claims, 3 Drawing Sheets

(56) References Cited

U.S. PATENT DOCUMENTS

| | | | |
|---|---|---|---|
| 4,792,536 A | * | 12/1988 | Pecoraro et al. .............. 501/70 |
| 4,920,080 A | | 4/1990 | Demarest, Jr. |
| 5,004,706 A | | 4/1991 | Dickinson |
| 5,028,248 A | * | 7/1991 | Williams et al. ............. 65/134.7 |
| 6,883,349 B1 | | 4/2005 | Jeanvoine |
| 2004/0050106 A1 | | 3/2004 | Murnane |
| 2004/0224833 A1 | | 11/2004 | Jeanvoine et al. |

OTHER PUBLICATIONS

International Search Report and Written Opinion, International Application No. PCT/US2012/062978, International Filing Date: Nov. 1, 2012, Mailing Date: Feb. 25, 2013, 12 pages.

* cited by examiner

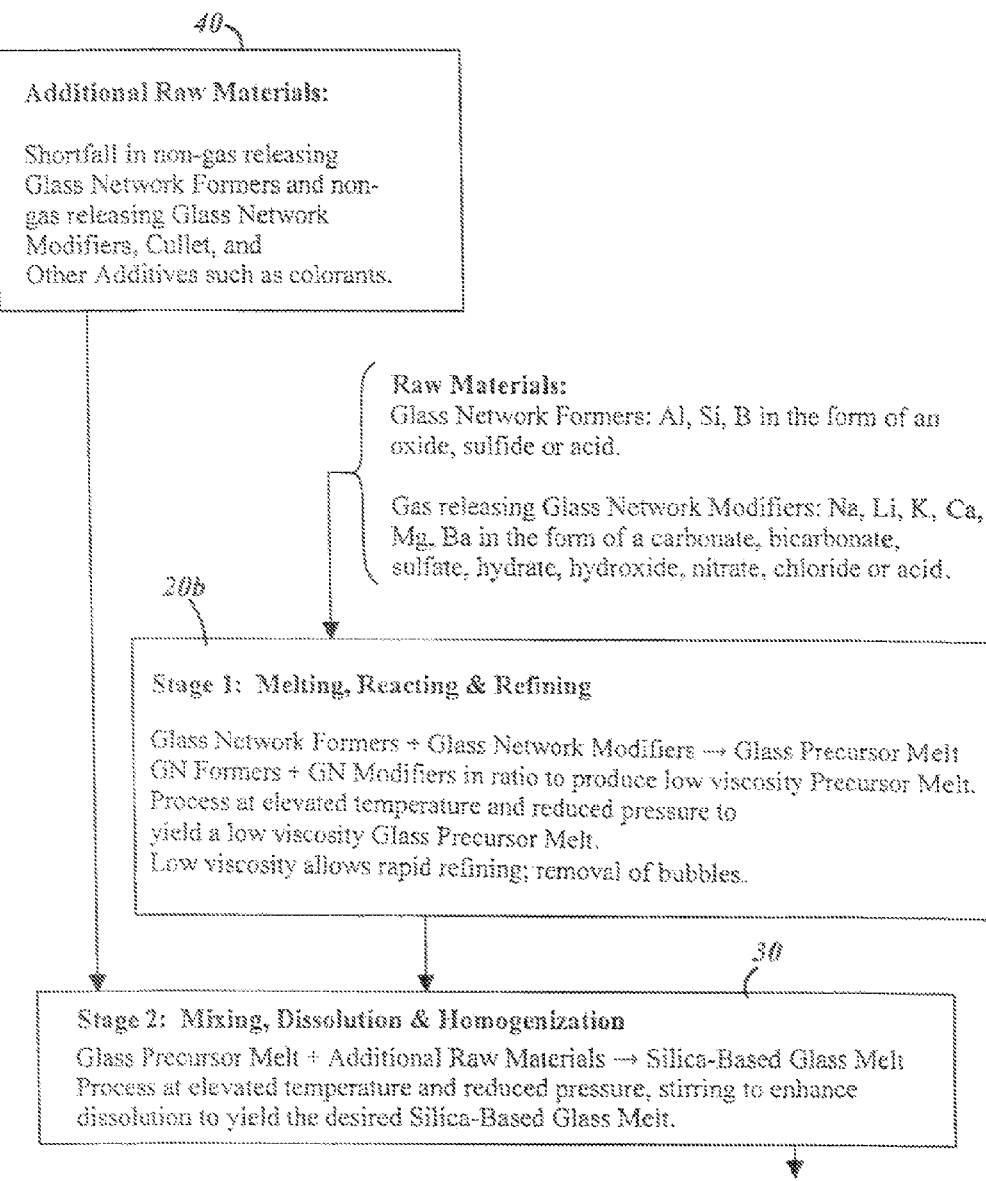

PROCESS FOR MELTING AND REFINING SILICA-BASED GLASS

The present disclosure relates to a process for melting and refining silica-based glass, and particularly to such a process that employs sodium-calcium-silicate glass as an intermediate product.

BACKGROUND AND SUMMARY OF THE DISCLOSURE

Silica-based glass, such as soda-lime glass, is prevalent in the manufacture of glass containers and other products. Formation of the glass melt typically involves mixing the various glass-forming components at elevated temperature. The glass typically has a residence time in a furnace on the order of twenty-four hours to fully dissolve the raw materials of the batch composition and to refine the glass by driving off gases. The gases must be driven off ultimately to produce a solidified glass product without entrained gas bubbles. (The process of removing bubbles in molten glass is called "refining.") In addition to being undesirably slow, this in-furnace process involves a large amount of space and high energy input.

A general object of the present disclosure is to provide a process for making silica-based glass, which is more rapid and requires less energy input than conventional processes.

The present disclosure embodies a number of aspects that can be implemented separately from or in combination with each other.

A process for making a silica-based glass, in accordance with one aspect of the present disclosure, includes: (a) reacting at least one glass network former and at least one glass network modifier to form a glass precursor melt, the glass precursor melt being at a temperature in the range of 900 C to 1700 C and having a viscosity of not more than 3 Pa·s, and (b) refining the glass precursor melt. Target viscosity typically would be in the range of 1 to 3 Pa·s, with a value of 2 Pa·s being an optimum target. The term "glass network former" is employed in its usual sense in the art as referring to oxides and non-oxides capable of forming and being incorporated into a random glass network or lattice. Silica ($SiO_2$), alumina ($Al_2O_3$) and boric oxide ($B_2O_3$) are three examples of glass network formers. The term "glass network modifier" likewise is employed in its usual sense to refer to oxides within the glass that do not participate in forming the glass network structure and force the glass network to form around the modifier. Examples include the oxides of the alkali metals (sodium, lithium and potassium) and oxides of the alkaline earth metals (calcium, magnesium and barium).

Either or both steps (a) and (b) can be carried out under reduced pressure to enhance refining. The refined glass precursor melt preferably is mixed with additional glass network former materials including silica ($SiO_2$) and/or non-gas releasing network modifiers to form the desired glass melt composition. Cullet and/or minor ingredients such as colorants can be added at this stage. Step (b) can include stirring.

The term "gas releasing" is used to describe chemical forms of an element that evolve gases upon decomposition, including the carbonate, bicarbonate, sulfate, hydrate, hydroxide, nitrate, chloride or acid form(s) of a given element. The term "non-gas releasing" is used to describe chemical forms of an element that do not evolve gases upon decomposition, including the oxide, sulfide and elemental forms of a given element.

A process for making a silica-based glass in accordance with another aspect of the present disclosure includes: (a) forming a low-viscosity sodium-calcium-silicate solution in liquid phase while releasing gaseous reaction products, and (b) mixing the sodium-calcium-silicate solution with additional material including silica to form a soda-lime glass melt. Step (a) is carried out by (a1) melting, reacting and refining calcium carbonate, soda ash and silica, or (a2) by melting, reacting and refining salt and silica in the presence of water followed by addition of calcium carbonate. The sodium-calcium-silicate liquid solution intermediate phase product of step (a) preferably has a viscosity of not more than 3 Pa·s to promote release of gaseous reaction products such as carbon dioxide in step (a1) or hydrogen chloride in step (a2). Step (a) and/or step (b) can be carried out under reduced pressure further to promote release of gaseous reaction products. Step (b) can include stirring.

A process for making a glass precursor melt in accordance with a third aspect of the disclosure includes mixing at least one glass network former with at least one glass network modifier, and refining the glass precursor melt by performing at least part of the mixing step at elevated temperature and under reduced pressure to promote release of gases. Preferably, all of the gas releasing glass network modifiers and gas releasing glass network formers that are required to achieve the desired glass product melt composition are added to the precursor melt for refining in step (a). Additional non-gas releasing glass network formers and non-gas releasing glass network modifiers are mixed with the glass precursor melt to form the desired glass product melt composition. Cullet and/or minor ingredients such as colorants can be added.

BRIEF DESCRIPTION OF THE DRAWINGS

The disclosure, together with additional objects, features, advantages and aspects thereof, will best be understood from the following description, the appended claims and the accompanying drawings, in which:

FIG. 3 is a block diagram of a process for reacting, melting and refining silica-based glass in accordance with a third exemplary embodiment of the disclosure.

DETAILED DESCRIPTION OF PREFERRED EMBODIMENTS

A process for making a silica-based glass melt in accordance with the present disclosure employs glass network formers and glass network modifiers to form a glass precursor melt having low viscosity from which bubbles readily migrate. The amounts of the glass network formers and/or the glass network modifiers obtain the desired bubble-releasing low viscosity at a desired temperature, preferably in the range of 900 C to 1700 C. Glass network modifiers are added to the precursor melt to decrease the viscosity and the refining time to achieve full liberation of bubbles from the precursor melt. A greater percentage of glass network formers would necessitate a higher melt temperature to obtain the desired low viscosity for refining. Thus, a balance is obtained between glass network formers and glass network modifiers to optimize the glass precursor melt with respect to low viscosity. After the glass precursor melt has been refined, additional glass network formers can be added to achieve the desired final glass melt composition. These additional glass network formers can be added as sulfides, acids and/or oxides. Cullet and/or minor ingredients such as colorants can also be added.

The glass network former(s) preferably is (are) selected from the group consisting of $SiO_2$, $Al_2O_3$ and $B_2O_3$. The glass network modifier(s) preferably is (are) selected from the group consisting of compounds of alkali metals (sodium, lithium and/or potassium) and compounds of alkaline earth metals (calcium, magnesium and/or barium). The gas releasing glass network modifier(s) most preferably is (are) a carbonate, bicarbonate, sulfate, hydrate, hydroxide, nitrate, chloride or acid form(s) of the noted metals.

Figure 1:
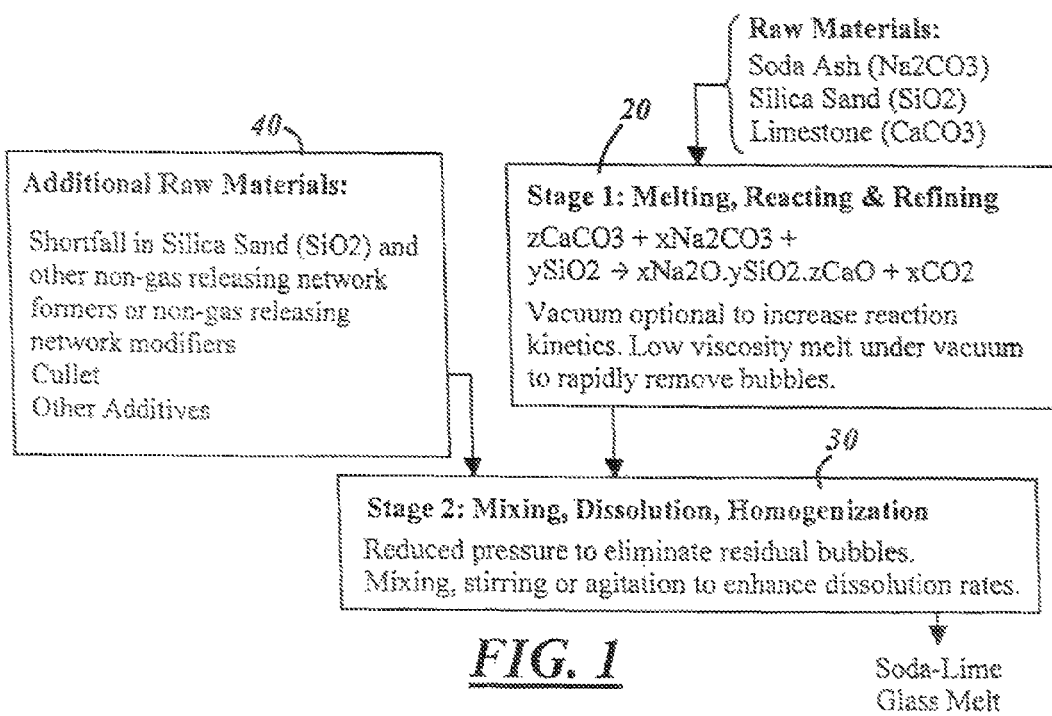
FIG. 1 is a block diagram of a process for reacting, melting and refining silica-based glass in accordance with one exemplary embodiment of the disclosure.

FIG. 1 illustrates a process for making silica-based glass in accordance with one exemplary embodiment of the present disclosure. A first stage 20 of the process involves melting, reacting and refining input materials and production of a low-viscosity sodium-calcium-silicate ($Na_2O.SiO_2.CaO$) solution in liquid phase by melting, reacting and refining silica ($SiO_2$) and substantially all of the desired gas releasing glass network modifiers. This reaction produces a silicate solution in liquid phase and having a relatively low viscosity to promote release of gas reaction products. The term "low-viscosity" in accordance with the present disclosure means having a viscosity of not more than 3 Pa·s. This first stage 20 preferably is carried out under reduced pressure (vacuum) further to promote release of gaseous reaction products. The silicate solution precursor melt or intermediate product of this first stage typically has a silica molar content on the order of 40-60%.

The silicate solution precursor melt or intermediate product of the first stage 20 is fed to the second stage 30, which involves mixing, dissolution and homogenization of the glass precursor melt with additional raw materials 40, including the shortfall of glass network formers silica ($SiO_2$) or alumina ($Al_2O_3$) or boric oxide ($B_2O_3$) and/or additional non-gas releasing network modifier materials needed to reach the desired composition of the final glass melt. Cullet and/or minor ingredients such as colorants 40 can be added in this second stage 30. Additional silica is added at the second stage 30 to reach the desired final glass composition with a silica content typically on the order of 65-80% by weight. The second stage 30 can include stirring and/or other mixing to promote dissolution and homogenization of the final silica-based glass melt.

Figure 2:
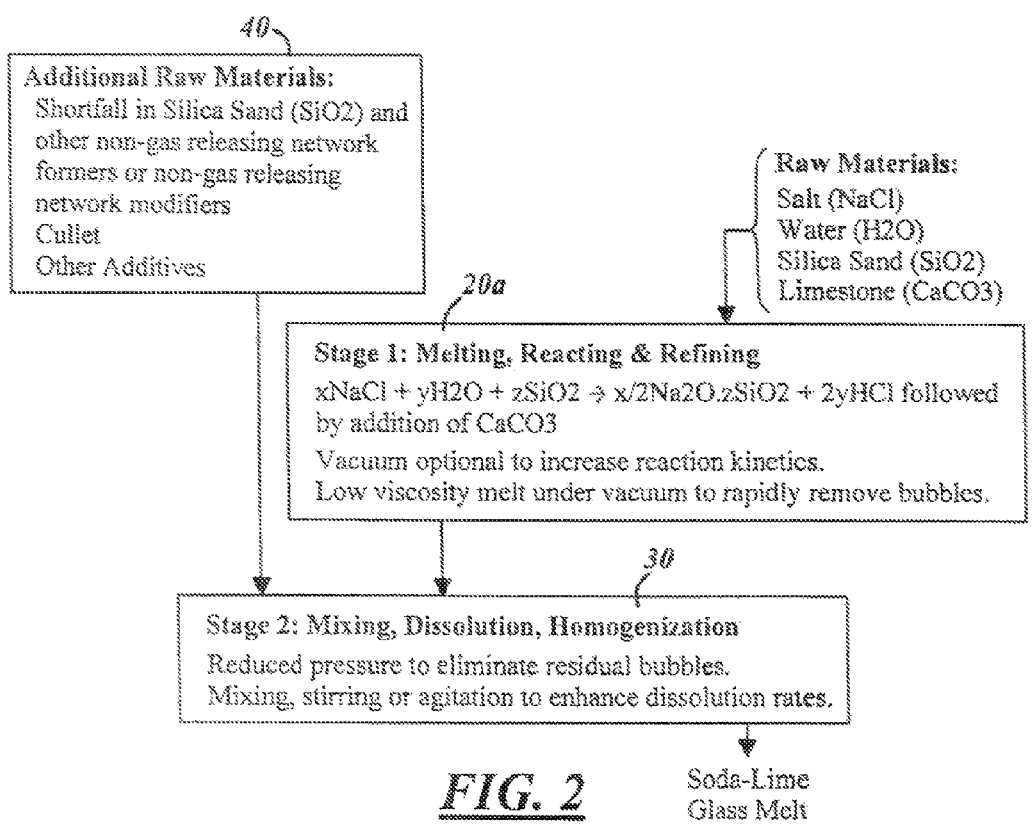
FIG. 2 is a block diagram of a process for reacting, melting and refining silica-based glass in accordance with a second exemplary embodiment of the disclosure.

FIG. 2 illustrates a second embodiment of the process in accordance with the present disclosure. In this process, the first stage 20a involves melting, reacting and refining salt (NaCl) and silica ($SiO_2$) in the presence of water ($H_2O$, preferably steam) to produce sodium silicate ($Na_2O.SiO_2$) and release hydrogen chloride (HCl) gas. This step is immediately followed by addition of calcium carbonate ($CaCO_3$) such as limestone. The calcium carbonate is rapidly melted, again to produce a low-viscosity sodium-calcium-silicate solution in liquid phase to promote release of gaseous reaction products. Again, the first stage 20a can be carried out under vacuum further to promote release of gaseous reaction products. The second stage 30, which involves mixing, dissolution and homogenization of the precursor melt with additional raw materials 40 in FIG. 2 is the same as the second stage in FIG. 1. The result of either process is a silica-based glass melt.

FIG. 3 illustrates a third embodiment of the process in accordance with the present disclosure. In this process, the first stage 20b involves melting, reacting and refining substantially all of the gas releasing glass network modifiers required for the desired final melt composition with appropriate chemical ratio of glass network formers to produce a glass precursor melt having low viscosity from which bubbles readily migrate. In the second stage, the glass precursor melt is mixed with non-gas releasing glass network modifiers and/or non-gas releasing glass network formers to achieve the desired final glass melt composition. Cullet and other additives such as colorants may be added in the second stage 30, which may include stirring.

The first stage 20 in FIG. 1 or 20a in FIG. 2 or 20b in FIG. 3 preferably is carried out at a temperature in the range of about 900 C to about 1700 C. The second stage 30 in FIGS. 1, 2 and 3 preferably is carried out at a temperature greater than about 900 C. Most preferably, the first stage 20, 20a or 20b is carried out at a temperature of about 1250 C for not more than 2 hours. The glass network modifiers within the precursor melt 20 or 20a or 20b preferably have an alkali metal to alkaline metal molar ratio of 1:3 to 3:1. The glass precursor melt preferably has a glass network modifier to glass network former molar ratio of 2:1.5 to 1:2. The sodium-calcium-silicate solution glass precursor melt of the first stage 20 or 20a preferably has a sodium:calcium:silica molar ratio of about 1:1:1.5 to 1:1:4.

In summary, the glass precursor melt composition at the first stage 20 or 20a or 20b is designed to minimize the viscosity at reasonable processing temperatures to facilitate refining. Therefore, all glass network modifiers that are in a chemical form that releases gases upon decomposition are added in the first stage (20 or 20a or 20b). And, all glass network formers that are added in chemical form that releases gases upon decomposition are added in the first stage. Additionally, any glass network former or glass network modifier that is added in a chemical form that does not release gases upon decomposition may be added in the first stage at appropriate chemical ratios to minimize the viscosity of the glass precursor melt. All materials added in the second stage (30) are to be in a chemical form that does not release a significant quantity of gases upon decomposition.

There thus has been disclosed a process for making silica-based glass that fully achieves all of the objects and aims previously set forth. The disclosure has been presented in conjunction with presently referred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. A process for making a glass product melt composition, which includes the steps of:
   (a) providing a first mixture of raw materials that includes a glass network former and gas releasing glass network modifiers;
   (b) providing a second mixture of raw materials that includes an additional amount of said glass network former and non-gas releasing glass network modifiers;
   (c) melting and reacting said first mixture of raw materials to form a glass precursor melt having a temperature in the range of 900 C to 1700 C and having a viscosity of not more than 3 Pa·s;
   (d) refining said glass precursor melt, wherein said viscosity of said glass precursor melt promotes release of gaseous reactions products from said precursor melt that evolved upon decomposition of said gas releasing glass network modifiers in said step (c); and then
   (e) dissolving said second mixture of raw materials in said refined glass precursor melt to form a final glass melt that has a greater percentage of said glass network former than said glass precursor melt.

2. The process set forth in claim 1 wherein said step (d) includes performing said step (c) under reduced pressure.

3. The process set forth in claim 1 wherein said glass network former is selected from the group consisting of compounds of Si, Al and B.

4. The process set forth in claim 3 wherein said glass network former is selected from the group consisting of the oxide, sulfide or acid forms of the recited elements.

5. The process set forth in claim 1 wherein substantially all gas releasing glass network modifiers required to form said final glass melt in said step (e) are provided in said step (a).

6. The process set forth in claim 1 wherein said glass network modifiers are selected from the group consisting of elements and compounds of sodium (Na), lithium (Li), potassium (K), calcium (Ca), magnesium (Mg), and barium (Ba).

7. The process set forth in claim 6 wherein said gas releasing glass network modifiers are selected from the group consisting of the carbonate, bicarbonate, sulfate, hydrate, hydroxide, nitrate, chloride or acid forms of the recited elements.

8. The process set forth in claim 6 wherein said non-gas releasing glass network modifiers are selected from the group consisting of the oxide, sulfide or elemental forms of the recited elements.

9. The process set forth in claim 1 wherein said glass precursor melt includes at least one alkali metal and at least one alkaline earth metal and has an alkali metal to alkaline earth metal molar ratio of 1:3 to 3:1.

10. The process set forth in claim 1 wherein said glass precursor melt has a molar ratio of glass network modifiers to glass network formers of 2:1.5 to 1:2.

11. The process set forth in claim 1 wherein said step (e) is carried out at a temperature greater than about 900 C.

12. The process set forth in claim 1 wherein said step (e) includes stirring.

13. The process set forth in claim 1 wherein said second mixture of raw materials includes cullet.

14. The process set forth in claim 1 wherein said glass network modifiers are selected from the group consisting of compounds of alkali metals and compounds of alkaline earth metals.

15. The process set forth in claim 1 wherein said glass network former is silica (SiO2) and said glass melt formed in said step (e) includes 65-80 wt. % silica (SiO2).

16. A process for making a glass product melt composition, which includes the steps of:
(a) forming a glass precursor melt by melting and reacting a mixture of raw materials that includes a glass network former and one or more as releasing glass network modifiers, wherein said glass network modifiers and said glass network former are mixed together at a molar ratio in the range of 2:1.5 to 1:2 such that said glass precursor melt has a desired low viscosity at a temperature in the range of 900 C to 1700 C;
(b) refining said glass precursor melt, wherein said low viscosity of said glass precursor melt promotes release of gaseous reactions products from said glass precursor melt that evolved upon decomposition of said one or more as releasing glass network modifiers in said step (a); and then
(c) dissolving additional raw materials in said refined glass precursor melt to form a glass product melt composition having a higher viscosity than said glass precursor melt at the same temperature.

17. The process set forth in claim 16 wherein said glass precursor melt has a viscosity of not more than 3 Pa·s during said step (b).

18. The process set forth in claim 16 including:
stirring said glass precursor melt during said step (c) to promote dissolution of said additional raw materials and homogenization of said glass product melt composition.

19. The process set forth in claim 16 wherein said one or more gas releasing glass network modifiers include substantially all gas releasing glass network modifiers that are required to achieve said glass product melt composition.

20. The process set forth in claim 16 wherein said glass product melt composition has a greater percentage of said glass network former than said glass precursor melt.

21. The process set forth in claim 16 wherein said step (c) includes dissolving an additional amount of said glass network former in said glass precursor melt to achieve said glass product melt composition.

22. The process set forth in claim 16 wherein the amount of said glass network former in said glass precursor melt is less than the total amount of said glass network former that is required to achieve said glass product melt composition.

23. The process set forth in claim 16 wherein said steps (a) and (b) are performed in not more than 2 hours.

24. The process set forth in claim 16 wherein said step (b) is performed under reduced pressure to promote release of gaseous reaction products from said glass precursor melt.

25. The process set forth in claim 16 wherein said step (b) is carried out at a temperature in the range of 1250 C to 1450 C.

26. The process set forth in claim 16 wherein said step (c) includes dissolving non-gas releasing glass network modifiers in said glass precursor melt to achieve said glass product melt composition.

27. A process for making a glass product melt composition, which includes the steps of:
(a) providing raw materials including a glass network former and gas releasing glass network modifiers, wherein said glass network former is selected from the group consisting of elements and compounds of silicon (Si), aluminum (Al), and boron (B) and said gas releasing glass network modifiers are selected from the group consisting of compounds of alkali metals and compounds of alkaline earth metals;
(b) melting and reacting said raw materials to form a precursor solution in liquid phase having a glass network modifier to glass network former molar ratio in the range of 2:1.5 to 1:2 such that said precursor solution has a desired low viscosity at a temperature in the range of 900 C to 1700 C;
(c) refining said precursor solution, wherein said low viscosity of said precursor solution promotes release of gaseous reactions products from said precursor solution that evolved upon decomposition of said gas releasing glass network modifiers in said step (b); and then
(d) dissolving additional raw materials in said precursor solution to form a final glass melt, wherein said additional raw materials include an additional amount of said glass network former and said final glass melt includes a greater percentage of said glass network former than said precursor solution.

28. The process set forth in claim 27 wherein said glass network modifier to glass network former molar ratio provides said precursor solution with a viscosity of not more than 3 Pa·s.

29. The process set forth in claim 27 wherein the amount of said glass network former provided in said step (a) is less than the total amount of said glass network former that is required to achieve said glass product melt composition.

30. The process set forth in claim 27 wherein said glass network former provided in said step (a) is silica (SiO2).

31. The process set forth in claim 30 wherein said precursor solution includes 40-60 mol. % silica (SiO2).

32. The process set forth in claim 30 wherein said final glass melt formed in said step (d) includes 65-80 wt. % silica (SiO2).

33. The process set forth in claim 30 wherein said precursor solution formed in said step (b) is a sodium-calcium-silicate precursor solution that has a sodium:calcium:silicon molar ratio in the range of 1:1:1.5 to 1:1:4.

34. The process set forth in claim 27 wherein said additional raw materials dissolved in said precursor solution in said step (d) include a non-gas releasing glass network modifier selected from the group consisting of elements, sulfides, and oxides of alkali metals and elements, sulfides, and oxides of alkaline earth metals.

* * * * *